US010238995B2

(12) United States Patent
Volkel et al.

(10) Patent No.: US 10,238,995 B2
(45) Date of Patent: Mar. 26, 2019

(54) HDS CHANNEL EXIT DESIGNS FOR IMPROVED SEPARATION EFFICIENCY

(71) Applicant: Palo Alto Research Center Incorporated, Palo Alto, CA (US)

(72) Inventors: Armin R. Volkel, Mountain View, CA (US); Kai Melde, Stuttgart (DE); Ashutosh Kole, San Francisco, CA (US); Huangpin B. Hsieh, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 212 days.

(21) Appl. No.: 14/304,049

(22) Filed: Jun. 13, 2014

(65) Prior Publication Data

US 2014/0367348 A1    Dec. 18, 2014

Related U.S. Application Data

(60) Provisional application No. 61/835,468, filed on Jun. 14, 2013.

(51) Int. Cl.
*B01D 21/26*    (2006.01)
*B01D 21/34*    (2006.01)

(52) U.S. Cl.
CPC ............ *B01D 21/265* (2013.01); *B01D 21/34* (2013.01)

(58) Field of Classification Search
CPC .............................. B01D 21/265; B01D 21/34
See application file for complete search history.

(56) References Cited

U.S. PATENT DOCUMENTS

| | | |
|---|---|---|
| 2008/0128331 A1 | 6/2008 | Lean et al. |
| 2009/0114601 A1 | 5/2009 | Lean et al. |
| 2009/0114607 A1 | 5/2009 | Lean et al. |
| 2009/0283452 A1 | 11/2009 | Lean et al. |
| 2009/0283455 A1 | 11/2009 | Lean et al. |
| 2010/0072142 A1 | 3/2010 | Lean et al. |
| 2010/0314323 A1 | 12/2010 | Lean et al. |
| 2010/0314327 A1 | 12/2010 | Lean et al. |
| 2011/0096327 A1 | 4/2011 | Papautsky et al. |
| 2014/0262973 A1 | 9/2014 | Johnson et al. |

OTHER PUBLICATIONS

International Search Report for PCT/US2014/042291 dated Nov. 3, 2014.

*Primary Examiner* — David A Reifsnyder
(74) *Attorney, Agent, or Firm* — Fay Sharpe LLP

(57) ABSTRACT

Hydrodynamic separation of suspended particles using curved channels offers advantages in many applications, since it is a fast continuous flow technology that can handle neutrally and near neutrally buoyant particles without the need of a physical barrier or the addition of chemical aids. Designs are provided for a flow splitter at the end of the separation channel, to maintain smooth, counter-vortex-free laminar flow and improve particle separation efficiency while reducing clogging and fouling propensities.

10 Claims, 8 Drawing Sheets

VELOCITY FIELD
HIGHER VELOCITY NEAR OUTSIDE WALL DUE TO CENTRIFUGAL FORCE

US 10,238,995 B2

HDS CHANNEL EXIT DESIGNS FOR IMPROVED SEPARATION EFFICIENCY

INCORPORATION BY REFERENCE

This application claims priority to and is based on U.S. Provisional Application No. 61/835,468, filed on Jun. 14, 2013, which is incorporated herein by reference in its entirety.

BACKGROUND

Separation of particles from a fluid without the use of a physical barrier has many advantages. The ability to separate neutrally buoyant particles from a fluid without a barrier and/or the addition of chemicals or other particles is even better. Hydrodynamic separation (HDS), which utilizes the specific flow patterns in a curved channel for particle concentration and separation, has proven to be such a technology.

BRIEF DESCRIPTION

In one aspect of the presently described embodiments, a hydrodynamic separator device comprises a curved channel, having first and second opposed walls, operative to facilitate particle separation using hydrodynamic forces to generate a first stream of fluid comprising a band or concentration of particles and a second stream, an outlet having a first exit path for the first stream and a second exit path for the second stream, a bifurcation junction in the outlet comprising inner walls of the first and second exit paths and defining divergence between the first and second exit paths, wherein the inner walls connecting the channel with the exit paths are such that they do not contain any sharp turns or any corners and do not promote formation of recirculation zones.

In another aspect of the presently described embodiments, the first wall of the channel is straight through a region opposite the bifurcation junction on an outer wall of the first exit path and wherein the second wall of the channel continuously curves into an outer wall of the second exit path.

In another aspect of the presently described embodiments, the first wall of the channel is curved through a region opposite the bifurcation junction on an outer wall of the first exit path and wherein the second wall of the channel continuously curves into an outer wall of the second exit path.

In another aspect of the presently described embodiments, a first width of the channel at the bifurcation junction is a multiple of at least two times the magnitude of a second width of the channel adjacent the outlet.

In another aspect of the presently described embodiments, the bifurcation junction comprises a continuous curved surface defining the divergence between the first and second exit paths.

In another aspect of the presently described embodiments, a hydrodynamic separator device comprises a curved channel, having first and second opposed walls, operative to facilitate particle separation using hydrodynamic forces to generate a first stream of fluid comprising a band or concentration of particles and a second stream, an outlet having a first exit path for the first stream and a second exit path for the second stream, a bifurcation junction in the outlet comprising inner walls of the first and second exit paths and defining divergence between the first and second exit paths, wherein a first width of the channel at the bifurcation junction is a multiple of at least two times the magnitude of a second width of the channel adjacent the outlet.

In another aspect of the presently described embodiments, the bifurcation junction comprises a continuous curved surface defining the divergence between the first and second exit paths.

In another aspect of the presently described embodiments, a hydrodynamic separator device comprises a curved channel, having first and second opposed walls, operative to facilitate particle separation using hydrodynamic forces to generate a first stream of fluid comprising a band or concentration of particles and a second stream, an outlet having a first exit path for the first stream and a second exit path for the second stream, a bifurcation junction in the outlet comprising inner walls of the first and second exit paths and defining divergence between the first and second exit paths, wherein the bifurcation junction comprises a continuous curved surface.

In another aspect of the presently described embodiments, a first width of the channel at the bifurcation junction is a multiple of at least two times the magnitude of a second width of the channel adjacent the outlet.

In another aspect of the presently described embodiments, a hydrodynamic separator device comprises a curved channel, having first and second opposed walls, operative to facilitate particle separation using hydrodynamic forces to generate a first stream of fluid comprising a band or concentration of particles flowing a spaced distance from the first wall, a second stream of fluid flowing in the spaced distance, and a third stream of fluid, an outlet having a first exit path for the first stream, a second exit path for the second stream and a third exit path for the third steam.

In another aspect of the presently described embodiments, a majority of particles and less than 10% of the input fluid exit the device using one of the exit paths.

In another aspect of the presently described embodiments, a majority of particles and less than 10% of the input fluid exits the device using the middle exit path.

In another aspect of the presently described embodiments, a method for separating particles flowing within a fluid comprises receiving input fluid in a hydrodynamic separator device having a curved channel and at least a first, second and third exit path, and controlling the device to generate and position a particle band to exit the device through a selected one of the first, second or third exit path.

In another aspect of the presently described embodiments, the controlling comprises generating and positioning the particle band to exit the device with less than 10% of the input fluid.

In another aspect of the presently described embodiments, a hydrodynamic separator device comprises a curved channel, having first and second opposed walls, operative to facilitate particle separation using hydrodynamic forces to generate a first stream of fluid comprising a band or concentration of particles and a second stream, an outlet having a first exit path for the first stream and a second exit path for the second stream, a bifurcation junction in the outlet comprising inner walls of the first and second exit paths and defining divergence between the first and second exit paths, wherein the first wall of the channel and the second wall fan out and are smooth and free of sharp corners and wherein the second wall of the channel continuously curves into an outer wall of the second exit path.

In another aspect of the presently described embodiments, the first wall of the channel is straight through a region opposite the bifurcation junction on an outer wall of the first exit path.

In another aspect of the presently described embodiments, the first wall continually curves into an outer wall of the first exit.

DETAILED DESCRIPTION

As noted, hydrodynamic separation (HDS) of suspended particles using curved channels offers advantages in many applications, since it is a fast continuous flow technology that can handle particles, such as neutrally and near neutrally buoyant particles, without the need of a physical barrier or the addition of chemical aids. This technique utilizes a variety of different forces to achieve separation. For example, because of centrifugal forces on the liquid flowing through the channel in at least some situations, transverse flow patterns emerge. Under certain flow conditions and geometrical constraints, these transverse flow patterns emerge as a pair of Dean vortices. Particles entrained in such a flow are spiraling around vortex cores as they move along the channel. In certain locations, a combination of shear and inertia forces push the particles closer to the vortex centers, causing a dynamic focusing of the particles into a band near the vortex cores. Depending on channel geometry and flow conditions the vortex core location can be close to one of the side walls, hence separating the flow into a particle-rich and a particle-free or particle-reduced portion. At the end of the channel, the flow is typically split into two or more streams, one with concentrated particles, and the other(s) with reduced particles.

The present embodiments describe improved designs for a flow splitter in the outlet at the end of the separation channel. According to such embodiments, smooth, counter-vortex-free laminar flow is maintained while clogging and fouling propensities are reduced.

The design of the flow splitters and/or outlets according to the presently described embodiments allows for efficient separation (i.e. harvesting or removing) of the particles in the concentrated stream from the clean stream(s). For hydrodynamic separation devices to maintain selectively desired functions, the splitter designs according to the presently described embodiments achieve several goals, such as:

1. Maintenance of laminar flow;
2. Maintenance of the concentrated particle band as narrow and focused into and through the concentrate stream exit; and
3. Reduction of clogging and fouling propensity.

It should be appreciated that any of the various single embodiments or designs contemplated herein, or combinations of such embodiments or designs, may be implemented in any single device or system, or in a plurality of devices or systems.

Figure 1A:
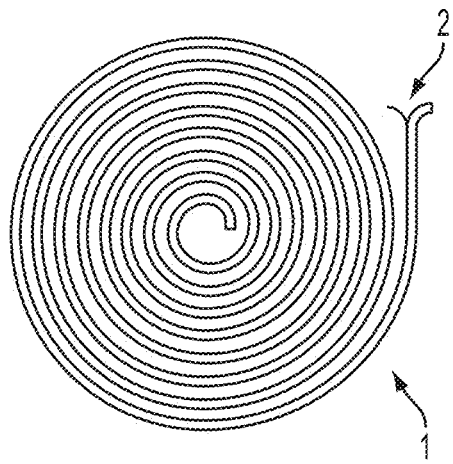
FIGS. 1a-1d show various environments of implementation of the presently described embodiments.
Figure 1B:
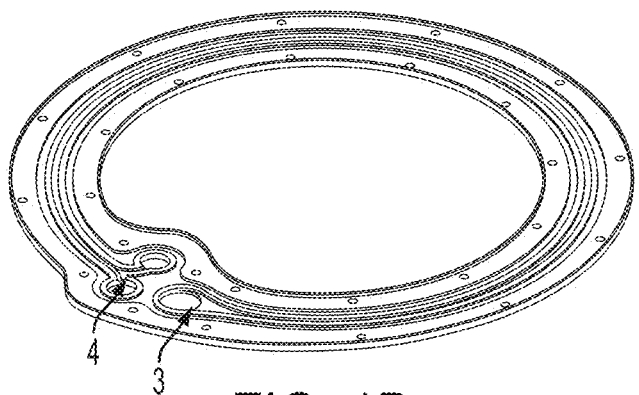
Figure 1C:
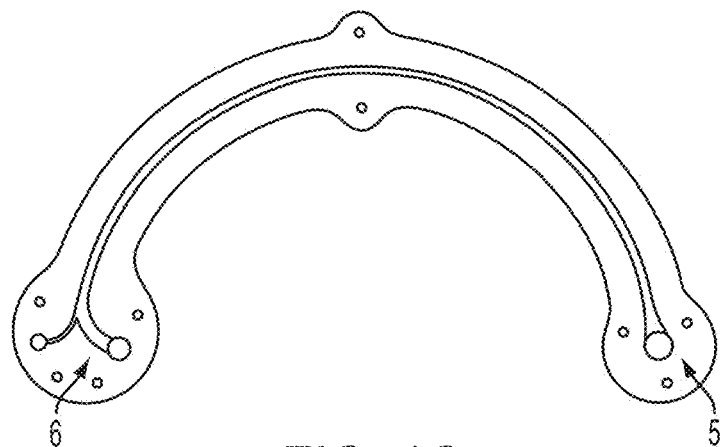
Figure 1D:
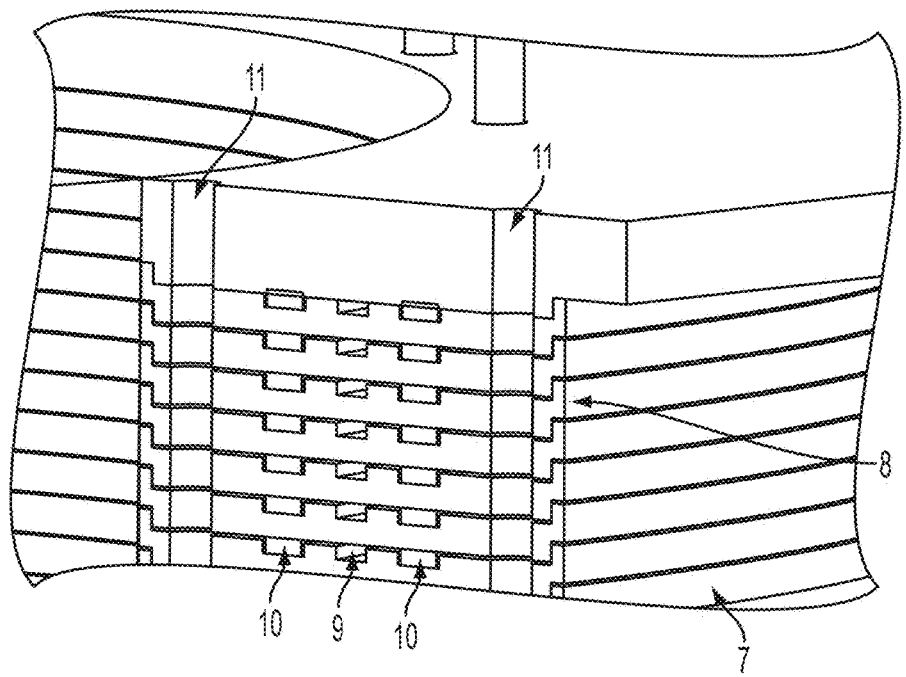

Further, the examples according to the presently described embodiments illustrate different designs in different operational scenarios that improve HDS separation efficiency. Of course, it should be appreciated that the different operational scenarios include a variety of different configurations of curved channel and devices that utilize various hydrodynamic forces, some of which are described above, to separate particles into portions of the field flow and/or bands of particles for purposes of separation. Examples of such curved channel HDS devices (or portions thereof) are illustrated in FIGS. 1a through 1d. FIG. 1a shows a representative view of a curved channel device 1 taking the form of an example single channel, spiral device that includes multiple turns. The device 1 has an outlet region 2. FIG. 1b shows a curved device 3 having a single channel, full turn configuration where the channel spans between 180 degrees and 360 degrees (e.g. close to 360 degrees as shown). The device 3 has an outlet region 4. FIG. 1c illustrates a curved device 5 having a single channel and a half turn configuration. The device 5 has an outlet region 6. FIG. 1d shows a stack 7 of a plurality of curved devices 8. Also shown are a channel 9, gaskets or sealing elements 10, and apertures 11.

It should be appreciated that such devices (e.g. those shown in FIGS. 1a through 1d) may be incorporated in a system for separating particles in fluid (e.g. liquid). Such a system may include control elements (e.g. control modules, processors, actuators, sensors, . . . etc.) to control the flow of the fluid to achieve the contemplated separation in the system.

Notably, according to the presently described embodiments, the outlets of these devices and other such devices may likewise take a variety of forms—some of which are shown (e.g. in regions 2, 4, and 6). However, according to the presently described embodiments, the outlets are provided with flow splitters (or splitter portions, exit paths, bifurcation junctions) to allow for the egress of fluid and separated particles from the separation channel(s) to various locations. The precise nature of these locations, much like the overall design and operational environment, will vary as a factor of the operating scenarios and environments of implementation.

In one embodiment, smooth corner-free walls are used to connect the hydrodynamic separator channel with a flow splitter at the outlet of the separator channel. In this regard, the flow inside one example of a properly functioning hydrodynamic separation channel is laminar to support the flow field necessary for the particle separation. In order to maintain such laminar flow and prevent the onset of turbulence at the splitter, in this example embodiment, the channel walls are formed as smooth surfaces free of sharp or large obstacles.

Figure 2A:
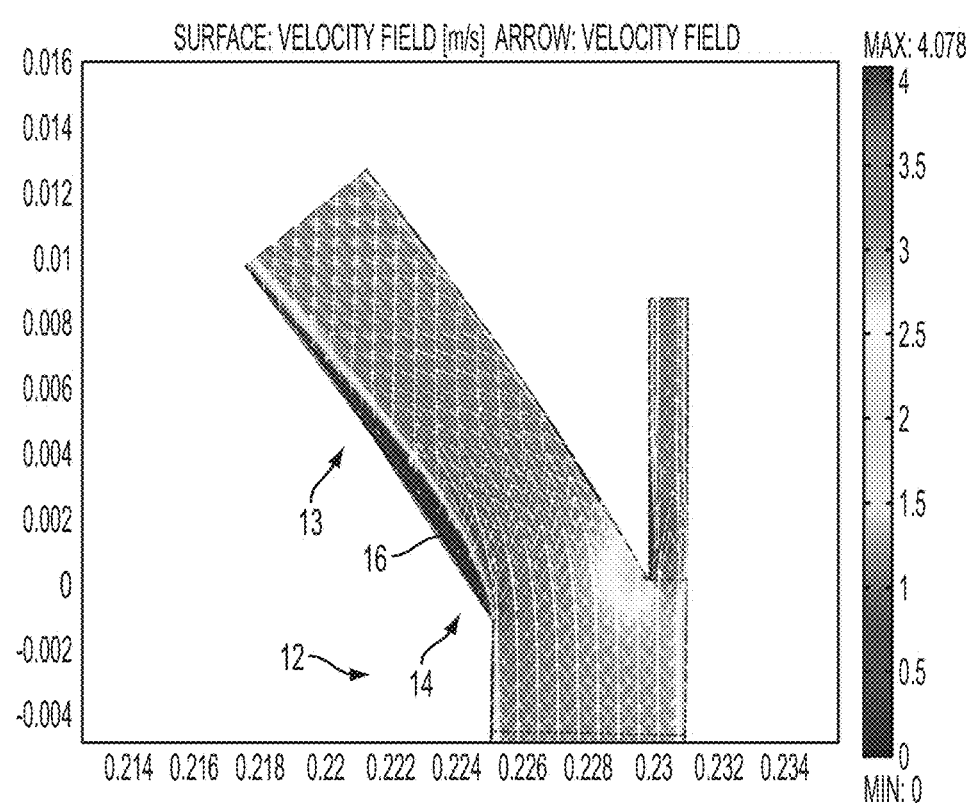
FIG. 2a is a velocity field illustration showing circumstances addressed by the presently described embodiments.

Conversely, a sharp bend or a sharp edge at the splitter creates the formation of a counter-rotating vortex along the channel direction—as depicted in the computational flow dynamics simulation result in FIG. 2a. FIG. 2a shows a channel 12 having a side wall portion 13 of the channel split including a sharp-angle bifurcation 14. As shown in FIG. 2, there is formation of a recirculation zone 16 after the sharp corner 14 where a low flow speed counter-rotating vortex is formed.

Although the above phenomenon is not the onset of a full-blown turbulent flow, the vortices of the recirculation zone 16 can have a detrimental impact on the separation result by (1) constricting the flow path through one or both exits and therefore offsetting the desired flow split, and by (2) disturbing the particle band and capturing particles in infinite re-circulation loops where they have a higher chance to interact with the channel walls and start building up a fouling layer. A fouling layer in such a situation typically restricts the flow and increases the chance of channel clogging. While the flow split can be adjusted independently through an active flow-control system with sensors (e.g. flow meters), actuators (e.g. pressure valves) and a controller (e.g. a PC), it is of high priority to avoid any flow patterns that enhance any fouling or clogging of the channels.

By designing an outlet with an appropriate flow splitter having a wall that allows a smooth transition without sharp angle turn, according to the presently described embodiments, laminar flow is better maintained and the low flow re-circulation zone such as this one can be avoided.

Figure 2B:
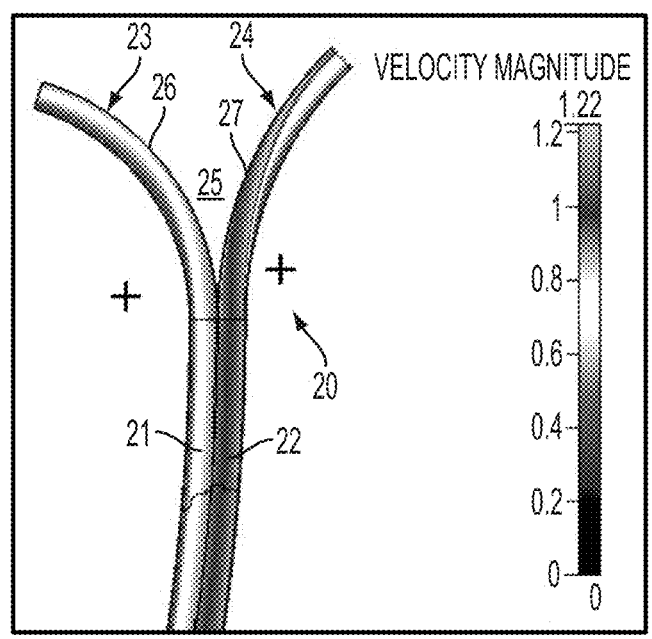
FIG. 2b is an illustration of an example embodiment according to the presently described embodiments.

In this regard, in one example, a bifurcation is provided so that the two exit paths at the splitter fan out such that the change in curvature of both the inside and outside channel walls are smooth and free of any sharp turns or corners. FIG. 2b depicts such a design for an outlet 20 for the channel having walls 21 and 22. Both exit paths 23 and 24 curve away from the main channel direction. The divergence of the exit paths is defined by a bifurcation junction 25, such junction also comprising the inner walls 26 and 27 of the exit paths 23 and 24. In this embodiment, no recirculation zone 16 is present.

In another embodiment, channel width is increased at the outlet or flow splitter to reduce fouling and clogging propensity. Oftentimes, the goal of a hydrodynamic separator is to concentrate particles into as small a liquid volume as possible. Thus, the flow through the concentrate stream at the exit also has to be as small a fraction of the total flow as possible, yet carry substantially the majority or all of the suspended particles. To reduce clogging of particles, especially near the concentrate side of the exit, widening of the channel at the splitter will help. It is analogous to the widening of freeway on- and off-ramps to reduce traffic congestion. As can be observed in design shown in FIGS. 3a and 3b and FIG. 4, the widths at the outlet regions 31, near the bifurcation junctions 25, are a multiple of at least 2 times (e.g. 2, 2.5, 3, 3.5, 4, . . . etc.) the magnitude of the width of the regular sections (shown representatively at 35 adjacent the outlet) of the HDS channel. Particles going with the flow through into the concentrate stream exit have more space and fewer interactions with the channel wall—and are less likely to be bounced back into the dilute stream when the width of concentrate stream is further reduced as split ratio increases to reduce total concentrate volume.

Figure 3A:
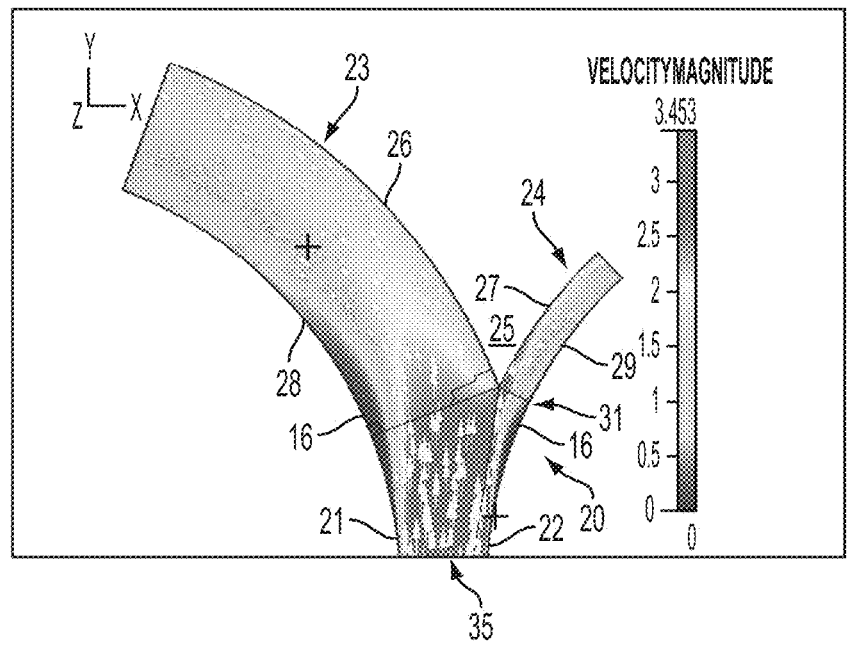
FIG. 3a is an illustration of an example embodiment according to the presently described embodiments.
Figure 3B:
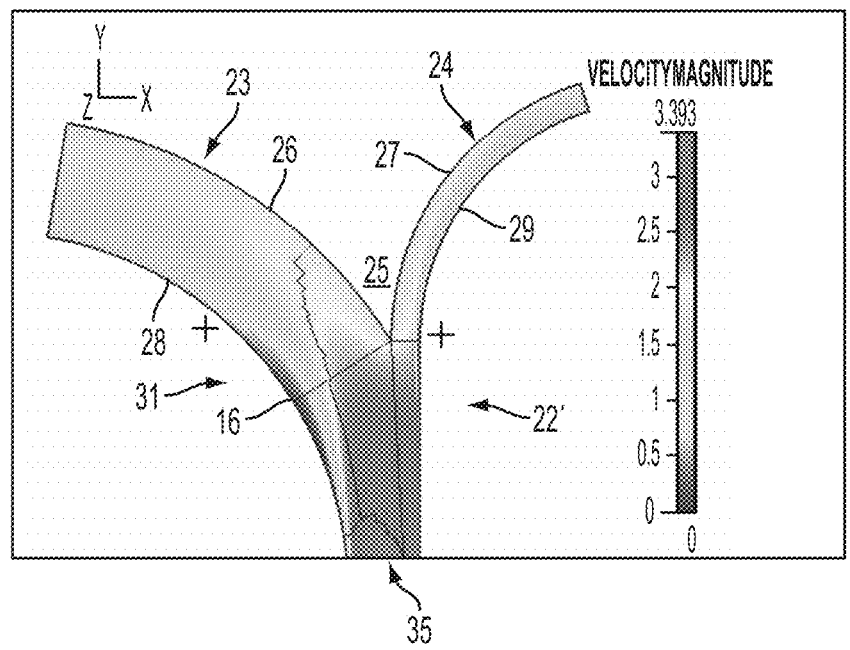
FIG. 3b is another example embodiment according to the presently described embodiments.

In a diverging channel recirculation zones can occur even with smooth, corner-free sidewalls due to a Venturi effect (see FIG. 3a). These recirculation zones are generated when the main flow streamlines detach from the side wall at the location where the channel widens. One way to reduce this effect is to very gradually increase the channel width, which is not necessarily favorable as it increases the total channel length and, hence, the energy requirements to operate the separator. Another option that uses the fact that we mainly need to suppress the recirculation zone near the side wall where the band forms is to force the streamlines to stay close to this side wall. FIG. 3b shows one such implementation, where the outside wall (where the band forms) is kept straight 22' during the channel widening section and before the flow splitter. Concentrate exit path 24 at the right side of the channel continues straight at the split, causing no vortex formation at this wall 22'. Thus, the wall portion is straight through a region opposite the bifurcation junction 25 on an outer wall 29 of the concentrate exit path 24. Also, as with FIG. 3a, the wall 21 of the channel continuously curves into an outer wall 28 of the exit path 23. The recirculation zone 16 is also reduced on the dilute or clean path 23. In addition, the divergence of the exit paths is defined by a bifurcation junction 25, such junction also comprising the inner walls 26 and 27 of the exit paths 23 and 24.

Figure 4:
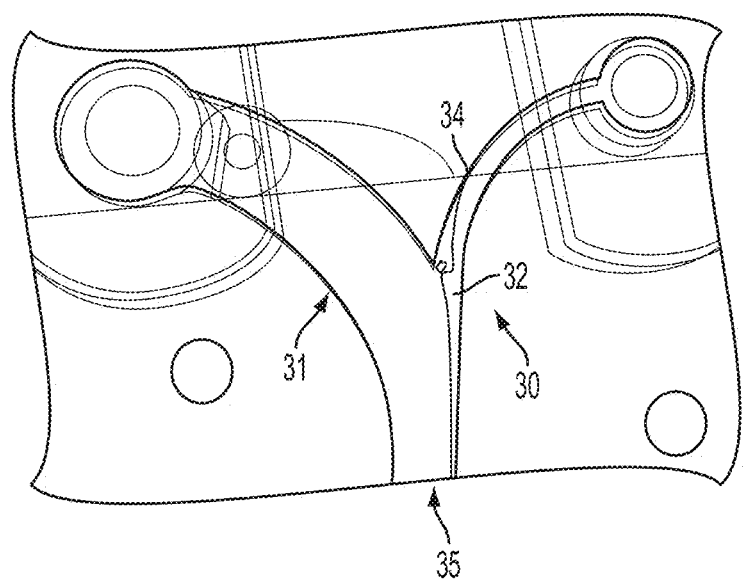
FIG. 4 is an example showing laboratory results according to an embodiment similar to that shown in FIGS. 3a and 3b.

An example of an HDS device 30 based on the concept depicted in FIG. 3b was implemented for algae separation. As shown in FIG. 4, a concentrated algae band 32 is allowed to flow through the splitter into the exit path 34 without disruption due to a significant curvature. The dark band 32 is formed by concentrated algae, which separate out well within the HDS channel and maintain a tight formation as they exit through the right side of the splitter without experiencing a significant curvature of the channel.

It should be appreciated that this example embodiment (e.g. the use of smooth, corner-free walls connecting the hydrodynamic separator device to the flow splitter thereof) results in a variety of advantages including:

a. minimizing band disturbances caused by geometric features;

b. reducing clogging and fouling tendencies within the channel; and c. eliminating dead flow and recirculation zones that increase fouling tendencies of trapped particles.

It should be appreciated that this example embodiment (e.g. increased channel width at the flow splitter) reduces fouling and clogging propensity by providing more space for the concentrated particle stream which reduces particle interaction with the wall. It also minimizes a chance of particles being bounced back from the wall into the dilute stream due to crowding effect, especially when high split ratio is implemented.

Figure 5:
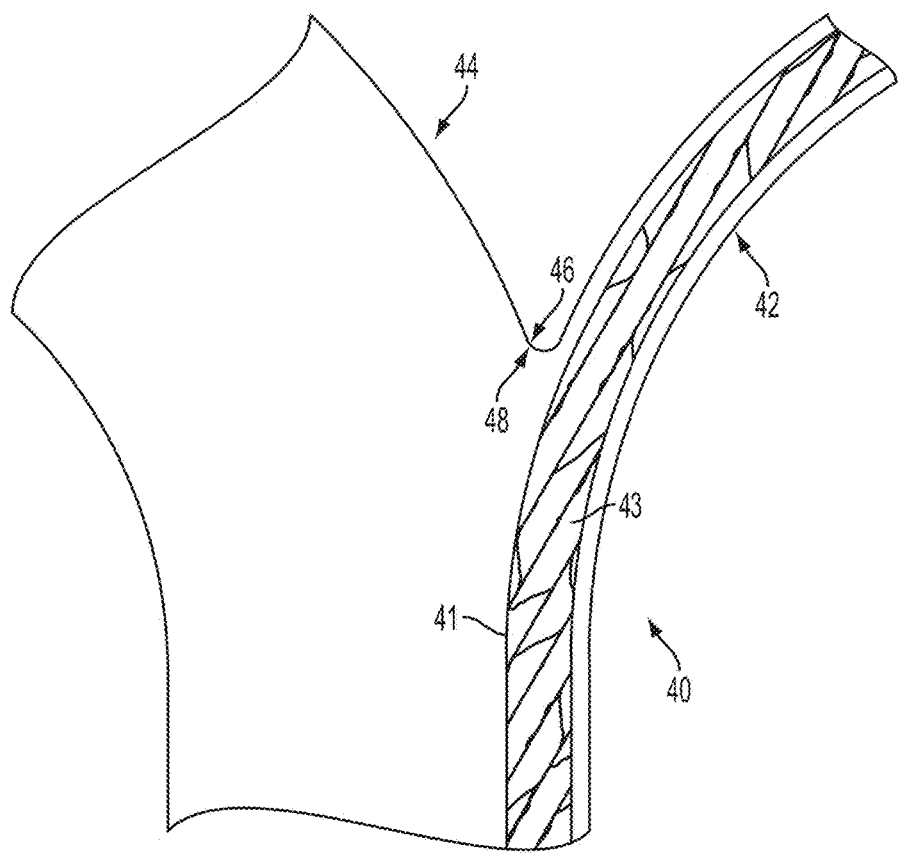
FIG. 5 is another example embodiment according to the presently described embodiments; and, FIG. 6 is another example embodiment according to the presently described embodiments.

In another embodiment, a bifurcation junction at the splitter is rounded to reduce fouling tendency. Though a sharp edge in a splitter reduces the chance for stagnation, elongated suspended matters, such as fibers, can easily get trapped (because of, e.g., shear forces near the wall), causing potential build-up of a fouling layer. Accordingly, as shown in FIG. 5, a rounded or curved edge at the bifurcation junction of the splitter is implemented to reduce trapping of elongated structures such as fibers. In this regard, an outlet 40 having a concentrate exit path 42 and a dilute or clean exit path 44 further includes a bifurcation junction 46 that is formed of a continuous curved or rounded edge 48. In this regard, the concentrated portion or band of fluid 41 is able to exit the channel and outlet 40 without having the elongated suspended particles or fibers, such as that shown at 43, collect or be trapped on a sharp edge at the bifurcation junction of the splitter.

It should be appreciated that the use of rounded bifurcation junction in the splitter reduces fouling tendency. This is especially applicable where elongated and fibrous matters are the subject of separation in the input fluid.

Figure 6:
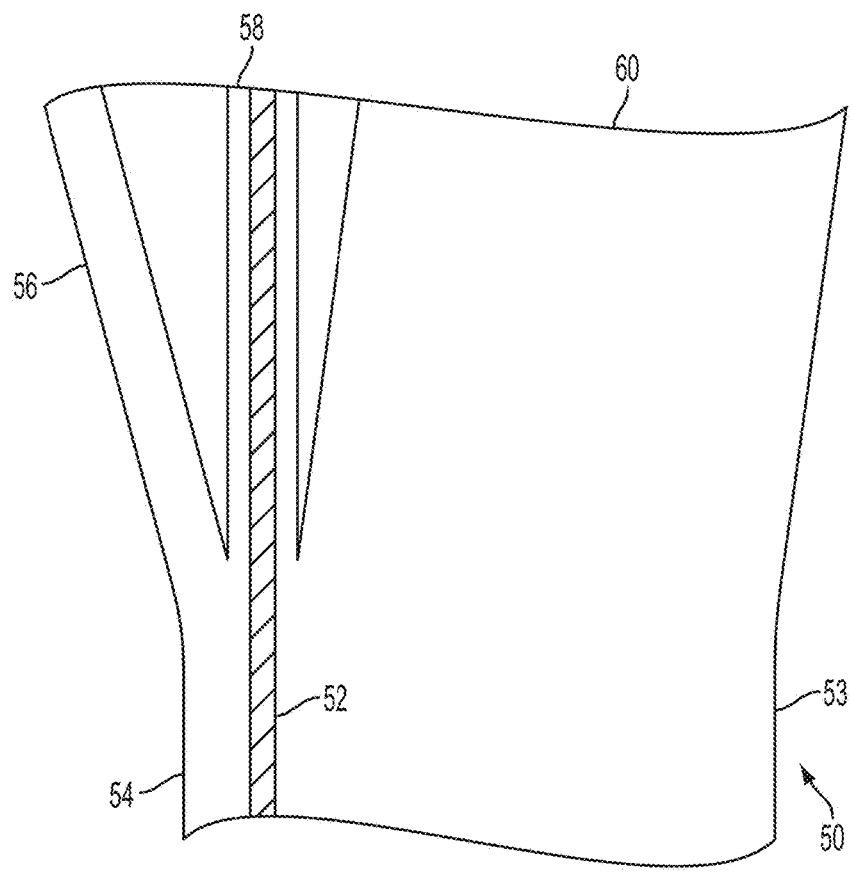

In another embodiment, a 3-way splitter design is implemented to further minimize liquid volume for the concentrate stream. If the concentrate band is very narrow, but not adjacent a side wall, a 3-way splitter will allow for an increased concentration of particles into one of the exit streams. FIG. 6 shows separation of particles in a microfluidic channel or outlet 50 having opposed walls 53 and 54, and exit paths 56, 58 and 60. This separation shows a particle band 52 formed near one wall 54 of the channel 50. That is, the particle band 52 flows a spaced distance from the wall 54. By adding the exit 56 adjacent the wall 54, the total flow of fluid through the concentrate channel 58 can be reduced while achieving a concentration increase in the concentrate channel 58.

As shown in FIG. 6, a 3-way splitter with an approximate 80-10-10 percentage of input fluid split (for exit paths 60, 58 and 56, respectively) is implemented. The majority of the particles (e.g. the majority of the particle band) is captured within the channel 58—accounting for less than 10% of the input flow through the entire channel 50. The remainder of the flow egresses through exit paths 56 and 60. Also, it is observed that a six-fold increase in particle concentration of the flow of fluid through the exit path 58 results with this embodiment.

In this way, for example, a 3-way splitter design minimizes liquid volume for the concentrate stream. This is especially useful in certain operational regimes where the concentrated particle band is not closest to one of the two side walls.

It should also be appreciated that the 3-way splitter may be improved (e.g. optimized) by changing the split ratios or relative location for concentrate particle stream. Doing so may achieve an even higher particle concentration or harvesting efficiency.

The contemplated 3-way splitter configuration may be controlled in a variety of manners. However, in at least one form, the 3-way splitter configuration may be controlled by, for example, the above noted control elements to tune the system to generate and position in the channel (and outlet) an appropriate particle band or portion to take advantage of the increased concentration opportunity of this embodiment. In this regard, for example, a method of operation of such a device includes receiving input fluid (e.g. liquid) in the separation system, controlling various aspects of the flow of the fluid (e.g. with a controller and/or control elements such as those noted herein) to generate and position (e.g. a spaced distance from a side wall) a particle band (or stream or portion) in the fluid to exit the channel via the appropriate exit path to achieve improved concentration. Of course, in one form, such control or tuning of the system takes into account the split ratios and relative locations of the exit paths.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A hydrodynamic separator device comprising:
a curved channel, having first and second opposed walls, operative to facilitate particle separation using hydrodynamic forces to generate a first stream of fluid comprising a band or concentration of particles and a second stream;
an outlet having a first exit path for the first stream and a second exit path for the second stream;
a bifurcation junction in the outlet comprising inner walls of the first and second exit paths and defining divergence between the first and second exit paths,
wherein a first width of the channel at the bifurcation junction is a multiple of at least two times the magnitude of a second width of the channel adjacent the outlet,
wherein the inner walls of the exit paths are such that they do not contain any sharp turns or any corners so as to avoid formation of recirculation zones,
wherein the first wall of the channel is one of straight or curved through a region opposite the bifurcation junction on an outer wall of the first exit path, and
wherein the second wall of the channel continuously curves into an outer wall of the second exit path.

2. The device as set forth in claim 1 wherein the bifurcation junction comprises a continuous curved surface defining the divergence between the first and second exit paths.

3. A hydrodynamic separator device comprising:
a curved channel, having first and second opposed walls, operative to facilitate particle separation using hydrodynamic forces to generate a first stream of fluid comprising a band or concentration of particles and a second stream;
an outlet having a first exit path for the first stream and a second exit path for the second stream;
a bifurcation junction in the outlet comprising inner walls of the first and second exit paths and defining divergence between the first and second exit paths,
wherein a first width of the channel at the bifurcation junction is a multiple of at least two times the magnitude of a second width of the channel adjacent the outlet,
wherein the first wall of the channel is one of straight or curved through a region opposite the bifurcation junction on an outer wall of the first exit path, and
wherein the second wall of the channel continuously curves into an outer wall of the second exit path.

4. The device as set forth in claim 3 wherein the bifurcation junction comprises a continuous curved surface defining the divergence between the first and second exit paths.

5. A hydrodynamic separator device comprising:
a curved channel, having first and second opposed walls, operative to facilitate particle separation using hydrodynamic forces to generate a first stream of fluid comprising a band or concentration of a majority of particles flowing a spaced distance from the first wall, a second stream of fluid flowing in the spaced distance, and a third stream of fluid;
an outlet having a first exit path for the first stream, a second exit path for the second stream and a third exit path for the third stream; and,
at least one control element configured to generate and position the band or concentration of a majority of particles to exit the channel based on a desired split ratio and relative location of the first, second and third exit paths, wherein the majority of particles and less than 10% of the input fluid exit the device using one of the exit paths.

6. The device as set forth in claim 5 wherein the majority of particles and less than 10% of the input fluid exits the device using the middle exit path.

7. A method for separating particles flowing within a fluid comprising:
receiving input fluid in a hydrodynamic separator device having a curved channel and at least a first, second and third exit path; and
controlling the device to generate and position a particle band of a majority of the particles to exit the device through a selected one of the first, second or third exit paths based on a desired split ratio and relative location of the first, second and third exit paths, wherein the controlling comprises generating and positioning the particle band to exit the device through one of the exit paths with less than 10% of the input fluid.

8. A hydrodynamic separator device comprising:

a curved channel, having first and second opposed walls, operative to facilitate particle separation using hydrodynamic forces to generate a first stream of fluid comprising a band or concentration of particles and a second stream;

an outlet having a first exit path for the first stream and a second exit path for the second stream;

a bifurcation junction in the outlet comprising inner walls of the first and second exit paths and defining divergence between the first and second exit paths, wherein the first wall of the channel and the second wall fan out and are smooth and free of sharp corners and wherein the second wall of the channel continuously curves into an outer wall of the second exit path.

9. The device as set forth in claim 8 wherein the first wall of the channel is straight through a region opposite the bifurcation junction on an outer wall of the first exit path.

10. The device as set forth in claim 8 wherein the first wall continually curves into an outer wall of the first exit.

\* \* \* \* \*